United States Patent [19]

Kondo et al.

[11] Patent Number: 4,602,290
[45] Date of Patent: Jul. 22, 1986

[54] MOS-TYPE IMAGE SENSOR WITH BRANCH READOUT

[75] Inventors: Ryuji Kondo, Sunnyvale; J. Gilbert Tisue, Los Altos, both of Calif.

[73] Assignee: Fuji Photo Film Co., Ltd., Kanagawa, Japan

[21] Appl. No.: 593,170

[22] Filed: Mar. 26, 1984

[51] Int. Cl.[4] .............................................. H04N 3/14
[52] U.S. Cl. .................................................... 358/213
[58] Field of Search ....................... 358/213, 212, 209; 357/24 LR; 250/578

[56] References Cited

U.S. PATENT DOCUMENTS 3,904,818  9/1975  Kovac ................................. 358/213
4,209,806  6/1980  Koike et al. ........................ 358/213

OTHER PUBLICATIONS

RCA Technical Notes #937, 9/6/73; Kovac; Michael George.

Primary Examiner—Gene Z. Rubinson
Assistant Examiner—Stephen Brinich
Attorney, Agent, or Firm—Sughrue, Mion, Zinn, Macpeak & Seas

[57] ABSTRACT

The transfer transistors employed in an MOS image sensor for coupling the sensor array outputs to a smaller number of output terminals are arranged in tiers so that the image sensor output terminals are selectively connected to the sensor array outputs through a plurality of branches only one of which is conductive at any one time, thus substantially reducing the number of drains to which each sensor output terminal is connected at any one time.

9 Claims, 4 Drawing Figures

CONVENTIONAL READ OUT

MODEL FOR ESTIMATION

BRANCH READ OUT

ADDED CIRCUIT DETAIL

MOS-TYPE IMAGE SENSOR WITH BRANCH READOUT

BACKGROUND OF THE INVENTION

This invention is directed to MOS-type image sensors, and more particularly to an arrangement for reading out data from such sensor arrays.

A conventional MOS-type image sensor may be arranged substantially as shown in FIG. 1. The image sensor includes a sensor array 10 comprising an array of MOS-type sensing elements, and a vertical shift register 12 for selectively energizing rows in the sensor array 10. The array 10 provides a plurality of outputs, with the plurality being assumed to be 768 for purposes of the following description. Each of the 768 outputs from the sensor array is connected to the source of a respective one of 768 video transfer transistors 14, and the drains of the transfer transistors 14 are connected to four output terminals 16. Thus, each output terminal is coupled to the drains of 192 transfer transistors. A horizontal shift register 18 clocked by a clock source (not shown) selectively energizes the gates of appropriate transfer transistors in order to couple the sensor array outputs to the output terminal 16.

The operation of the image sensor shown in FIG. 1 is known in the art and need not be described in detail at this time. However, such image sensors have typically exhibited excessive output capacitances at each of the four output terminals 16. These output capacitances determine the S/N ratio of the system output, and it would therefore be generally desirable to minimize the output capacitances of the output terminals 16 in order to increase the S/N ratio and thereby improve system performance.

It is therefore an object of the present invention to provide an image sensor having improved S/N output characteristics, and it is a more particular object of the present invention to improve the S/N output characteristics of an image sensor by reducing the output capacitances of the sensor output terminals.

SUMMARY OF THE INVENTION

Briefly, the above and other objects of this invention are realized by decreasing the number of video transfer transistors to which each output terminal is connected at any one time, thereby decreasing the contribution of the video transfer transistors to the output capacitance. According to the present invention, the video transfer transistors are arranged in tiers, with the first tier including a plurality of groups of transfer transistors, with each output terminal being coupled to the drain of at least one transistor in each group in the first tier. A second tier of transfer transistors includes a plurality of groups of transistors, with the drains of each transistor in any given group being connected in common to the source of a respective one of the transistors in the first tier. Subsequent tiers, if necessary, are connected in a similar manner, with each subsequent tier including a plurality of groups of transistors and the transistors in each group having their drains connected in common to the source of one transistor in the tier immediately above. The lowermost tier of video transfer transistors comprises the same number of transistors as in the conventional case, e.g., 768 transfer transistors, coupled to respective ones of the sensor array outputs.

In addition to the horizontal shift register of the conventional arrangement, the present invention employs a tiered arrangement of flip-flop circuits for driving the video transfer transistors. Thus, at the expense of an increased number of circuit components, which can be easily produced in large quantities with VLSI technology, the present invention achieves a substantial decrease in the number of video transfer transistor drains which may be connected at any one time to a given output terminal, thus substantially decreasing the output capacitance of each terminal and thereby enhancing the S/N characteristics of the sensor output.

BRIEF DESCRIPTION OF THE DRAWINGS

The invention will be more clearly understood from the following description in conjunction with the accompanying drawings, wherein.

DETAILED DESCRIPTION OF THE PREFERRED EMBODIMENT

Figure 1:
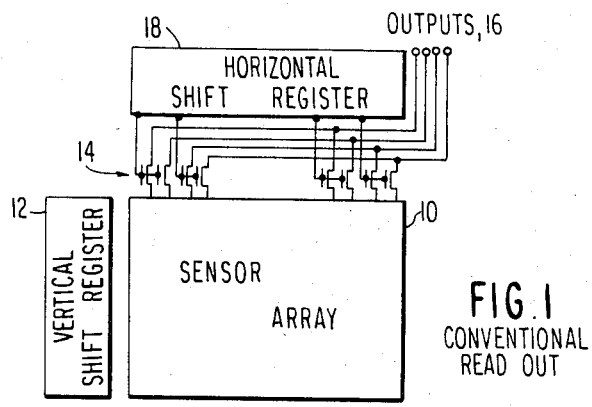
FIG. 1 is a brief diagram of a conventional MOS-type image sensor.

As mentioned above, and with reference again to FIG. 1, each output terminal 16 in a conventional image sensor may typically be connected to the drains of 192 video transfer transistors 14. Upon analyzing the circuit arrangement of FIG. 1 in detail, the present inventors have realized that the output capacitance of any given output terminal 16 is determined to a substantial degree by the collective drain capacitances of the transfer transistors to which it is connected. For example, for an image sensor for a typical color television including four output terminals each connected to 192 video transfer transistors as shown in FIG. 1, the output capacitance of a single output terminal is determined by the capacitance of one Al line and by the collective capacitances of 192 drains. One Al line capacitance may typically be about 2 pf, while the collective capacitances of the 192 drains may be approximately 5 pf. It can easily be seen that the drain capacitances contribute a major portion of the overall output capacitance at each terminal 16, and the present invention reduces the output capacitance at each terminal by decreasing the contribution of the video transfer transistors to the overall output capacitance. More particularly, this decrease in the output capacitance is realized by decreasing the number of drains to which each output terminal may be connected at any given time.

Figure 2:
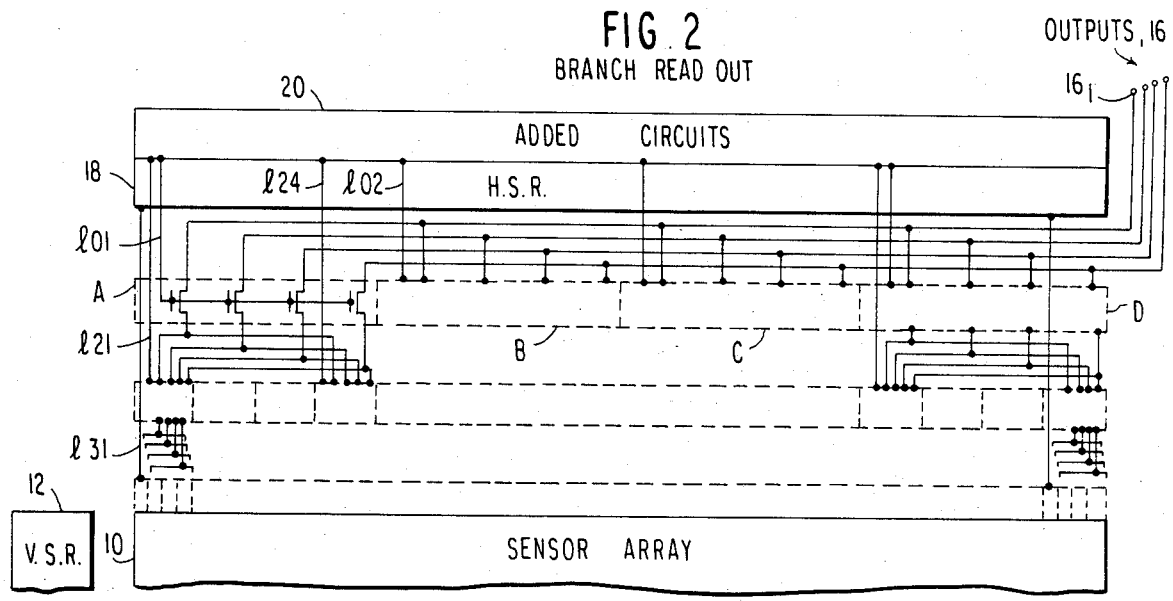
FIG. 2 is a brief diagram of the essential components of an image sensor employing branched readout according to the present invention.

The present invention will be more clearly described with reference to FIGS. 2-4. As shown in FIG. 2, the sensor array 10 continues to provide a normal number of array outputs, e.g., 768 array outputs, and the outputs from the array 10 are coupled to the sensor output terminals 16 through a transistor array. However, instead of providing only 768 video transfer transistors in a single tier as in FIG. 1, the present invention employs a plurality of tiers of transfer transistors. In the example presented herein, the sensor array provides 768 outputs, and each of the four output terminals 16 must be connectable to 192 of the 768 sensor array outputs. Rather than making this connection directly as in the prior art, the present invention employs multiple tiers of transfer transistors. The first tier of transfer transistors comprises four groups each including three transistors, with each output terminal 16 being coupled in common to the drains of the three transfer transistors in a respective group. A second tier of transfer transistors will include 48 transistors divided into 12 groups of four, with the drains in each group in the second tier being connected in common to the source of one respective transistor from the first tier. A third tier of transistors will include 192 transistors divided into 48 groups of four transistors each, and again the drains of each of the four transistors in a group in the third tier will be connected in common to the source of one respective transistor in the second tier. Finally, a fourth tier of transistors will comprise 768 transistors divided into 192 groups of four transistors each, with the drains of the four transistors in each group in the fourth tier being connected in common to the source of one respective transistor in the third tier. The sources of the 768 transistor in the fourth tier will connected to respective outputs from the sensor array 10.

The horizontal shift register 18, in conjunction with the added circuitry 20, will selectively energize the gates of the various transfer transistors in such a manner that only one of the first tier transistors to which each output terminal is connected will be on at any one time. Similarly, in the group of four transistors in the second tier which have their sources connected in common to the above mentioned on transistor, only one transistor will be conducting at any given time. Thus, each output terminal 16 will be conducted through only one branch path in each tier, and this will substantially reduce the number of drains to which each output terminal can be simultaneously connected. This can be more easily understood with reference again to the example described above in which the first tier of transfer transistors includes three groups of four transistors each, with each output terminal 16 being coupled to the drain of one transistor in each of the three groups. Any particular output terminal will thus be connected to the drains of only three transistors in the first tier. With only one of these three transistors being conductive at any given time, the output terminal will be connected to the drains of only four transistors in the second tier, i.e., the drains of the four transistors connected in common to the source of the single transistor in the first tier which is conductive. Similarly, of the four transistors in the second tier to which the output terminal is connected, only one will be conductive at any one time, so that the output terminal will be connected to the drains of only four transistors in the third tier, and so forth. Thus, in the combined first through fourth tiers of video transfer transistors, any given output terminal will be connected to only $(3+4+4+4)=15$ drains at any one time.

Figure 3:
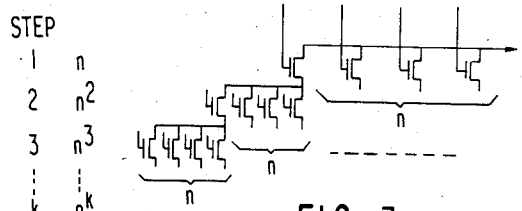
FIG. 3 is a brief diagram for explaining the interconnections of the various tiers of transfer transistors in FIG. 2.

The branch readout arrangement of the present invention can be more clearly seen from the illustration of FIG. 3. In general, each branch may be considered to be divided into n additional branches at each tier. A given output terminal will thus be connected to the drains of n transistors in the first tier. The sources of the n first tier transistors will, in turn, be coupled to the drains of $n^2$ transistors in the second tier, and the sources of the $n^2$ second tier transistors will be connected to the drains of $n^3$ transistors in the third tier. Assuming that there are k tiers, a large number of transfer transistors will be required to couple each output terminal to its appropriate sensor array outputs. However, with the conductivity of the transfer transistors controlled as described above so that the source of a transfer transistor in the ith tier is connected to the drains of n transistors in the $(i+1)$th tier, and also through the $(i+1)$th tier to the drains of only four transistors in the $(i+2)$th tier, etc., a given output terminal will be connected only to n times k drains at any given time.

Assuming that N represents the total number of transistors in the last tier which are connectable to any given sensor output terminal, the following equations will be satisfied:

$$N \leq n^k$$

$$C = aNk,$$

where a is the capacitance of one video transfer transistor and C is the total contribution of the video transfer transistors to the output capacitance of a given output terminal. For the case of $N=192$ as described above, branching in powers of 3 will require five tiers of transfer transistors in order to enable each output terminal to be connected to any one of 192 sensor array outputs, thus resulting in a total drain capacitance of approximately 15 times a. Branching in powers of 4 ($n=4$) will require four tiers of transfer transistors to enable connection of each output terminal to 192 sensor array outputs, thus resulting in a total drain capacitance 16 times a. Branching in powers of 5 will require four tiers of transistors, resulting in a total drain capacitance of 20 times a, ahd so forth. Due to the more complex connection arrangements in the branched readout system of the present invention, the Al line capacitance contribution will be somewhat higher, e.g., 1.5 times the conventional line capacitance for $n=3$, 1.44 four times the conventional line capacitance for $n=4$, and 1.65 times the conventional line capacitance for $n=5$. However, this slight increase in the capacitance contribution of the aluminum wiring layer will be more than offset by a substantial decrease in the total drain capacitance contribution.

To estimate actual device capacitance for a typical image sensor for a color television, $n=4$ results in an Al line capacitance of approximately 3 pf, and a total drain capacitance of approximately 0.4 pf. The total output capacitance for each output terminal is thus reduced to approximately 3.4 pf, as opposed to the 7 pf in the conventional device. This will result in a substantial increase S/N output characteristics.

It should be further noted that the above calculation is made for $N=4$ in all tiers. However, since the eventual number of sensor array outputs to be accessed may not be a power of 4, it may in some cases be possible to decrease the number of branches in one or more levels. For example, in the case described above where $N=192$, the first tier includes only three branching transistors connected to each output terminal. The output terminal is thus connected to one less drain, thereby further reducing the total drain capacitance.

As described above, additional circuitry 20 is required for driving the multiple tiers of transfer transistors. For the example given above for a sensor array having 768 outputs and four tiers of transfer transistors, a total of 1020 transfer transistors will be required, and these cannot be driven merely by the conventional outputs from the horizontal shift register. According to the preferred embodiment of this invention, the additional circuitry 20 may comprise a multi-tiered arrangement of flip-flop circuits arranged in a manner similar to the branched readout transistors.

In the explanation given above, each tier of video transfer transistors was described as being divided into a plurality of groups their drains connected in common. It should be noted, however, that a distinction may be drawn between "physical" and "electrical" groupings. In the circuit diagram of FIG. 2, for example, the transfer transistors in the first tier are shown in a plurality of physical groups ABCD with the gate terminals of all transistors in any one group being connected in common. Rather than having each output terminal 16 connected in common to the drains of all transistors in one of the physical groups A-D, the electrical "group" of transfer transistors in the first tier to which an output terminal is connected consists of one transistor from each of the physical groups A-D. More particularly, the output terminal $16_1$ is connected to the drains of transistors $A_1B_1C_1D_1$ where the "1" subscript indicates the left-most transfer transistor in the corresponding physical group.

Figure 4:
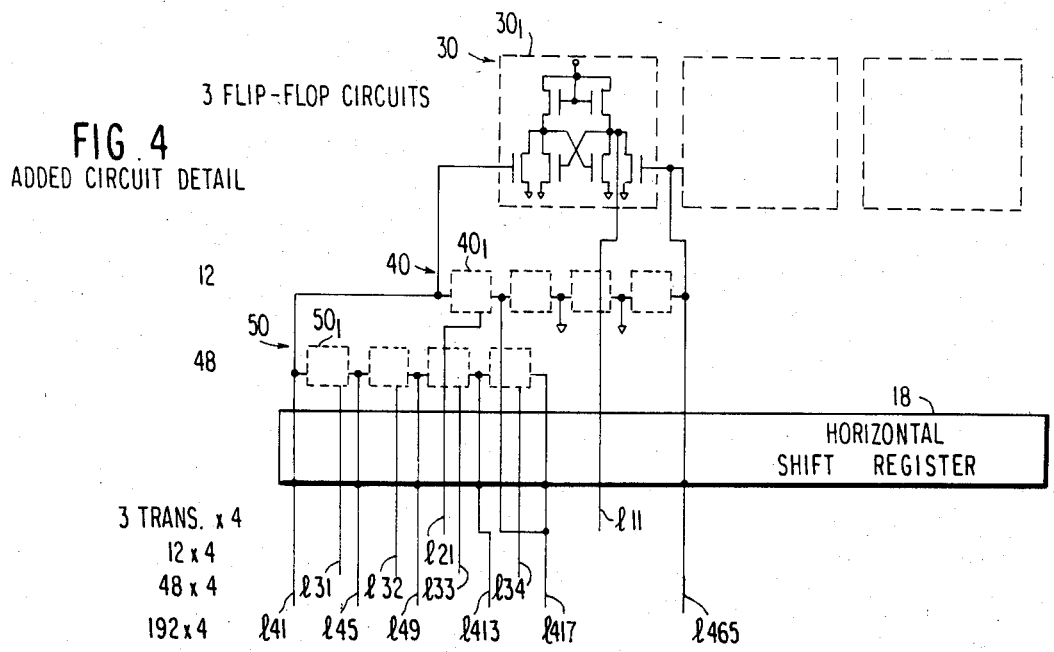
FIG. 4 is a brief schematic diagram illustrating in more detail the additional readout circuitry of FIG. 2.

FIG. 4 illustrates in more detail the additional circuitry required for controlling the video transfer transistors associated with one of the four output terminals 16 in FIG. 2. In addition to the horizontal shift register 18, the readout circuitry includes a first tier of three flip-flop circuits 30, a second tier 40 of 12 flip-flops and a third tier 50 of 48 flip-flops. Each flip-flop has two inputs and an output, in addition to being connected to a source of electric power (not shown), with the outputs from the flip-flops in the first tier 30 being designated $1_{11}-1_{13}$, the outputs from the flip-flops in the second tier 40 being designated $1_{21}-1_{212}$ and the outputs from the flip-flops in the third tier 50 being designated $1_{31}-1_{348}$. The outputs from the horizontal shift register are designated $1_{41}-1_{4N}$.

The left input to the flip-flop $30_1$ in FIG. 4 is received from the left-most output $1_{41}$ of the horizontal shift register 18, which is also coupled to the left-hand input of each of flip-flops $40_1$ and $50_1$. The right-hand inputs to the flip-flops $30_1$, $40_1$ and $50_1$ are received from the horizontal shift register outputs $1_{465}$, $1_{417}$ and $1_{45}$ respectively. It is seen that, for the case of a horizontal shift register output $1_{4i}$ connected to the left-hand input of a flip-flop, the right-hand input to the flip-flop would be taken from the shift register output $i+n$ for flip-flops in the third tier 50, from the shift register output $i+n^2$ for flip-flops in the second 40, and from the shift register output $i+n^3$ for flip-flops in the first tier 30, where n is the number of branches into which each branch is split at each level as shown in FIG. 3.

As in the conventional system of FIG. 1, the conduction of the 192 video transfer transistors coupled to the outputs of the sensor array is controlled directly by the outputs of the horizontal shift register 18. The purpose of the multi-tiered flip-flop arrangement is to insure that, when any given one of the 192 transfer transistors in the fourth tier is rendered conductive, the drain of that conductive transistor will be connected through the third through first tiers of transfer transistors to the appropriate output terminal. For example, in the conventional system of FIG. 1, a high level output from the left-most stage of the horizontal shift register 18 will result in the left-most one of the 192 video transfer transistors being coupled to the left-most one of the output terminals 16. Similarly, a high level output $1_{41}$ from the left-most stage of the horizontal shift register 18 in FIG. 4 will result in conduction of the left-most one of the 192 fourth tier transistors. The high level signal $1_{41}$ will also be provided to the left-hand input of each of the flip-flops $30_1$, $40_1$ and $50_1$, all of which have low level second inputs. As a result, the outputs $1_1$ $1_{21}$ and $1_{31}$ in FIGS. 2 and 4 will be at a high level, thus coupling the drain of the left-most fourth tier transistor to the output terminal $16_1$.

It should again be noted that the circuitry illustrated in FIG. 4 is only a portion of the branch readout circuitry. In actuality, as in the conventional system of FIG. 1, the horizontal shift register may include 384 shift register outputs each connected in common to the gates of two of the 768 transfer transistors which are coupled to respective ones of the outputs from the sensor array 10. The third tier of transistors will include 192 transfer transistors each having its source connected in common to the drains of 4 of the fourth tier transistors. The third tier transistors will be arranged in physical groups of four, with the gates of the transistors in each physical group of the third tier being connected in common to the output from one of the flip-flops in the third tier 50 of FIG. 4. The second tier of video transfer transistors will include 48 transfer transistors each having its source connected in common to the drains of four transfer transistors in the third tier. The second tier will be arranged in physical groups of four transistors each, with the gates of all transistors and one physical group being connected in common to the output from one of the flip-flops in the second tier 40 in FIG. 4. Finally, the first tier of transfer transistors will include 12 transistors arranged in three physical groups of four transistors each, with the source of each transistor in the first tier being connected in common to the drains of four transistors in the second tier, and the gates of all transistors in each physical group in the first tier being connected in common to the output from one of the flip-flops in the first tier 30 of FIG. 4. The four sensor output terminals $16_1-16_4$ will each be connected to the drain of one of the transistors in each of the three physical groups of the first tier of transfer transistors. With the operation of flip-flop circuits per se being well understood in the art, and with the connections described and illustrated, no further detailed explanation of the operation of the readout circuitry is necessary for a complete understanding of the invention.

While a specific embodiment of the invention has been described above, it should be appreciated that various changes and modifications can be made to the disclosed embodiment without departing from the spirit and scope of the invention as defined in the appended claims.

What is claimed:

1. An image sensor of the type including a plurality of output terminals, a sensor array having a plurality of outputs, and readout means for selectively connectng outputs from said sensor array to said output terminals, said readout means comprising:

a first tier of transfer transistors comprising a plurality of first transistors greater in number than the number of said output terminals, each of said first transistors having a source and having a drain connected to one of said output terminals, said first transistors being arranged in first groups of first transistors, each first group including a first predetermined number of first transistors having their drains connected in common to one of said output terminals;

at least a second tier of transfer transistors comprising a plurality of second transistors greater in number than the number of said first transistors, each of said second transistors having a source and having a drain coupled to the source of said first transistors, said second transistors being arranged in second groups of second transistors, each second group including a second predetermined number of second transistors having their drains connected in common to the source of one of said first translators in said first tier;

means for coupling sources of said second transistors to said sensor array outputs; and control means for controlling the source-drain conductivity of said first and second transistors such that no more than one of the transistors in any first group is conductive at any one time.

2. An image sensor as defined in claim 1, wherein only one of the second transistors whose drains are coupled to said one first transistor is conductive when said one first transistor is conductive.

3. An image sensor as defined in claim 1, wherein there are k tiers of transistors each including a plurality of groups of transistors, each group having the drains of its transistors connected in common to the source of one transistor in the tier immediately above, and each group in at least said second through kth tier including n transistors such that $n^k \geq N$, where N is the number of said sensor array outputs.

4. An image sensor as defined in claim 1, wherein said control means comprises:

a shift register having a plurality of outputs;

a plurality of flip-flops each having at least one input and an output;

means for providing outputs from said shift register to said flip-flop inputs; and means for connecting outputs from said flip-flops to gates of said first and second transistors to control the source-drain conductivity thereof.

5. An image sensor of the type including a plurality of output terminals, a sensor array having a plurality of outputs, and readout means for selectively connecting outputs from said sensor array to said output terminals, said readout means comprising:

a first tier of transfer transistors comprising a plurality of first transistors greater in number than the number of said output terminals, each of said first transistors having a source and having a drain connected to one of said out terminals;

at least a second tier of transfer transistors comprising a plurality of second transistors greater in number than the number of said first transistors, each of said second transistors having a source and having a drain coupled to the source of said first transistors;

means for coupling sources of said second transistors to said sensor array outputs; and control means for controlling the source-drain conductivity of said first and second transistors;

said control means comprising a shift register having a plurality of outputs, a plurality of flip-flops each having at least one input and an output, means for providing outputs from said shift register to said flip-flop inputs, and means for connecting outputs from said flip-flops to gates of said first and second transistors to control the source-drain conductivity thereof.

6. An image sensor as defined in claim 5, wherein said first tier of transistor comprises a plurality of first groups of first transistors, each first group including a first predetermined number of transistors having their drains connected in common to one of said output terminals, and wherein said second tier of transistors comprises a plurality of second groups of second transistors, each second group including a second predetermined number of second transistors having their drains connected in common to the source of a respective one of the first transistors in said first tier, and wherein said plurality of flip-flops comprises a first tier of flip-flops having outputs controlling the conductivity of said first transistors and a second tier of flip-flops having outputs controlling the conductivity of said second transistors.

7. An image sensor as defined in claim 6, wherein the output from each of the flip-flops in said first tier of flip-flops controls the conductivity in a first set of said first transistors, each said first set of first transistors comprising at least one transistor from each of said first groups, and wherein the output from each flip-flop in said second tier of flip-flops controls the conductivity of a second set of said second transistors, each said second set comprising at least one second transistor from each of said second groups of transistors.

8. An image sensor as defined in claim 7, further comprising third through kth tiers of transfer transistors, with the kth tier of transistors comprising N transistors each having a source connected to a respective one of N sensor array outputs, the transistors in said kth tier being arranged in groups with all transistors in each group having their drains connected in common to the source of one transistor in the (k−1)th of said first through kth tiers, the gate of each transistor in said kth tier receiving an output from said shift register as a control signal for controlling its source-drain conductivity.

9. An image sensor of the type including a plurality of output terminals, a sensor array having a plurality of outputs, and readout means for selectivity connecting outputs from said sensor array to said output terminals, said readout means comprising:

a first tier of transfer transistors comprising a plurality of first transistors greater in number than the number of said output terminals, each of said first transistors having a source and having a drain connected to one of said output terminals;

at least a second tier of transfer transistors comprising a plurality of second transistors greater in number than the number of said first transistors, each of said second transistors having a source and having a drain coupled to the source of said first transistors;

means for coupling sources of said second transistors to said sensor array outputs; and control means for controlling the source-drain conductivity of said first and second transistors such that no more than one of a plurality of the first transistors connected to the same output terminal is conductive at any one time.

* * * * *